(No Model.)

N. H. LINDLEY
JAW TRAP.

No. 246,022. Patented Aug. 23, 1881.

WITNESSES:

INVENTOR:
N. H. Lindley
BY
ATTORNEYS.

N. PETERS, Photo-Lithographer, Washington, D. C.

UNITED STATES PATENT OFFICE.

NOAH H. LINDLEY, OF BRIDGEPORT, CONNECTICUT, ASSIGNOR TO WILLIAM PERRY, OF SAME PLACE.

JAW-TRAP.

SPECIFICATION forming part of Letters Patent No. 246,022, dated August 23, 1881.

Application filed June 5, 1880. (No model.)

*To all whom it may concern:*

Be it known that I, NOAH H. LINDLEY, of Bridgeport, in the county of Fairfield and State of Connecticut, have invented a new and useful Improvement in Animal-Traps, of which the following is a specification.

The invention consists in the improvement in jaw-traps, as hereinafter described.

Figure 1:
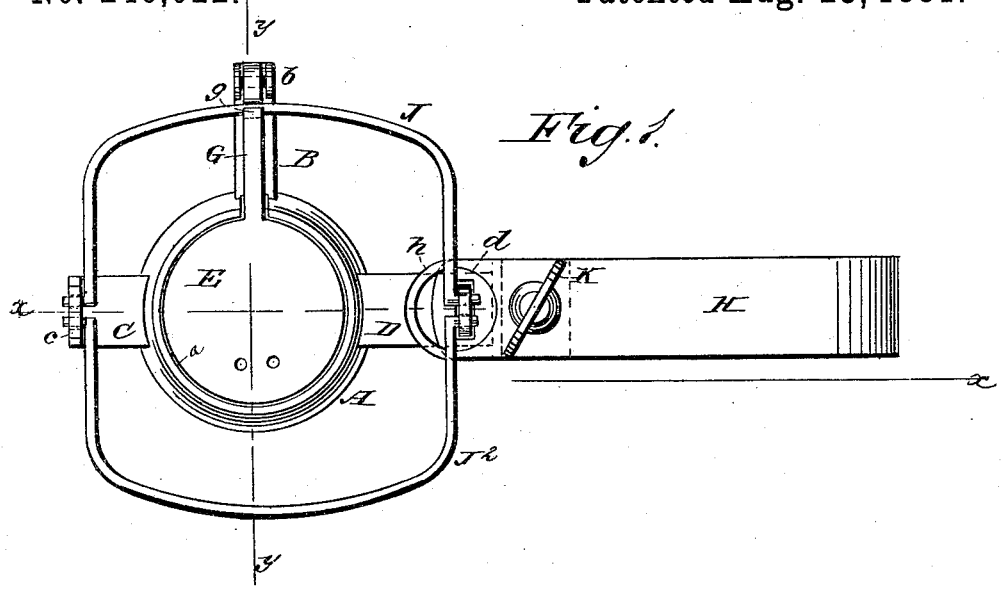
Figure 2:
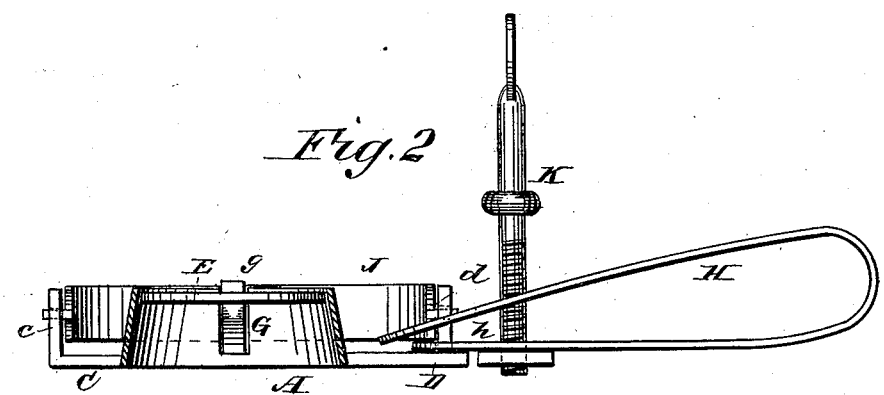
Figure 3:

In the accompanying drawings, Figure 1 is a top view, showing the trap set. Fig. 2 is a longitudinal vertical section taken in the line $x\ x$ of Fig. 1. Fig. 3 is a transverse vertical section taken in the line $y\ y$ of Fig. 1.

Similar letters of reference indicate corresponding parts.

The portion of the trap which carries the platform and jaws consists of a frame having a central circular band, A, and three radial arms, B C D, all made in one piece. Each of said arms has its end terminating in a vertical lug.

The platform consists of a circular plate, E, provided with a radial arm, G. The plate E works in the band A, and the arm G is pivoted in the lug $b$ of the arm B. The band A is formed with a contracted upper edge, $a$, within which the plate E fits when the trap is set, thus serving as a shield to prevent the entrance of any dirt or other substance under the platform, which might interfere with the proper working thereof.

It will be seen that the band A, projecting above the level of the plate E, prevents the latter from being struck by any falling object, as well as from being prematurely sprung by the animal placing a paw upon the edge, rendering it necessary for the animal to get well into the trap in a position to be caught before it can depress the plate. As the band is contracted at the upper mouth, there is no space between the band and plate for articles to wedge between the two and hold the plate, while when the latter is depressed the expanded diameter of the band permits absolute freedom of movement.

The jaws J J² are pivoted in the lugs $c\ d$ of the arms C D, so as to swing up and down in the usual manner.

The spring H is attached to the arm D by passing the lug $d$ through a slot in one end of said spring. The other end of the spring is provided with a loop, $h$, which embraces one end of each of the jaws in the usual manner.

When the trap is set the jaw J engages with a notch formed by an overhanging lip, $g$, of the arm G, and is held in a level position flush with the contracted top edge of the band A. The trap is sprung by depressing the platform in the usual manner, which disengages the lip $g$ and allows the spring to close the jaws.

In order to facilitate the setting of the trap, the spring H is provided with a thumb-screw, K, which may be screwed down so as to compress the spring until the trap is set and placed in position, and may then be unscrewed, so as to leave the spring free to act on the jaws.

The notch formed by the lip $g$ engages with three sides of the jaw J, and the point at which the arm G of the platform is pivoted to the arm B of the frame is outside of the jaw when the trap is set. By this means I am enabled to dispense with the trigger used in traps having the platform hinged inside of the jaw, as in this case the lip $g$ serves as a trigger.

The frame may be either cast or struck out, and in some cases the circular band A may be dispensed with.

I am aware that it is not new to combine a trap-plate with an annular frame or shield, and I therefore make no broad claim to such construction; but heretofore the trap plate has been so arranged relatively to the frame or shield that it projects above the edge of the latter and is liable to be prematurely sprung, which cannot occur when the plate is below the upper edge of the shield.

Having thus described my invention, I claim as new and desire to secure by Letters Patent—

In an animal-trap, the combination, with a band, A, formed with a contracted upper mouth, of radial arms B, C, and D, a pair of spring-acted jaws, J J², and a plate, E, attached to a pivoted arm, G, provided with a catch, $g$, and arranged within the band below the upper edge, as and for the purpose set forth.

NOAH H. LINDLEY.

Witnesses:
L. M. SLADE,
W. H. LEE.